United States Patent
Srinivasan

(10) Patent No.: US 8,683,484 B2
(45) Date of Patent: Mar. 25, 2014

(54) INTELLIGENTLY PRE-PLACING DATA FOR LOCAL CONSUMPTION BY WORKLOADS IN A VIRTUAL COMPUTING ENVIRONMENT

(75) Inventor: Kattiganehalli Y. Srinivasan, Princeton Junction, NJ (US)

(73) Assignee: Novell, Inc., Provo, UT (US)

( * ) Notice: Subject to any disclaimer, the term of this patent is extended or adjusted under 35 U.S.C. 154(b) by 1014 days.

(21) Appl. No.: 12/507,960

(22) Filed: Jul. 23, 2009

(65) Prior Publication Data

US 2011/0023048 A1 Jan. 27, 2011

(51) Int. Cl.
*G06F 9/46* (2006.01)
*G06F 13/00* (2006.01)

(52) U.S. Cl.
USPC .......................................... 718/105; 711/100

(58) Field of Classification Search
None
See application file for complete search history.

(56) References Cited

U.S. PATENT DOCUMENTS

| | | | |
|---|---|---|---|
| 6,199,165 B1 * | 3/2001 | Grunner | 726/3 |
| 6,742,080 B1 * | 5/2004 | Grimsrud et al. | 711/112 |
| 6,996,674 B2 | 2/2006 | Chiu et al. | |
| 2005/0015409 A1 * | 1/2005 | Cheng et al. | 707/200 |
| 2006/0123195 A1 | 6/2006 | Mukherjee | |
| 2006/0143401 A1 | 6/2006 | Doweck et al. | |
| 2007/0162462 A1 * | 7/2007 | Zhang et al. | 707/10 |
| 2008/0133578 A1 * | 6/2008 | Motoyama et al. | 707/102 |
| 2008/0282030 A1 * | 11/2008 | Kalwitz et al. | 711/114 |
| 2009/0063752 A1 * | 3/2009 | Dow | 711/6 |
| 2010/0017513 A1 * | 1/2010 | Abts | 709/226 |
| 2010/0076933 A1 * | 3/2010 | Hamilton et al. | 707/640 |

\* cited by examiner

*Primary Examiner* — Meng An
*Assistant Examiner* — James J Lee
(74) *Attorney, Agent, or Firm* — King & Schickli, PLLC

(57) ABSTRACT

Methods and apparatus involve intelligently pre-placing data for local consumption by workloads in a virtual computing environment. Access patterns of the data by the workload are first identified. Based thereon, select data portions are migrated from a first storage location farther away the workload to a second storage location closer the workload. Migration also occurs at a time when needed by the workload during use. In this manner, bandwidth for data transmission is minimized. Latency effects created by consumption of remotely stored data is overcome as well. In various embodiments, a data vending service and proxy are situated between a home repository of the data and the workload. Together they serve to manage and migrate the data as needed. Data recognition patterns are disclosed as is apportionment of the whole of the data into convenient migration packets. De/Encryption, (de)compression, computing systems and computer program products are other embodiments.

17 Claims, 6 Drawing Sheets

INTELLIGENTLY PRE-PLACING DATA FOR LOCAL CONSUMPTION BY WORKLOADS IN A VIRTUAL COMPUTING ENVIRONMENT

FIELD OF THE INVENTION

Generally, the present invention relates to computing devices and environments involving computing workloads. Particularly, although not exclusively, it relates to pre-placing data close to workloads to minimize data transmission bandwidth and overcome latency effects created by consumption of remotely stored data. Certain embodiments contemplate identifying access patterns of the data by the workloads, while others contemplate using this information to apportion the whole of the data into convenient migration packets. De/Encryption, (decompression, computing systems and computer program products are other features, to name a few.

BACKGROUND OF THE INVENTION

"Cloud computing" is fast becoming a viable computing model for both small and large enterprises. The "cloud" typifies a computing style ill which dynamically scalable and often virtualized resources are provided as a service over the Internet. The term itself is a metaphor. As is known, the cloud infrastructure permits treating computing resources as utilities automatically provisioned on demand while the cost of service is strictly based on the actual resource consumption. Consumers of the resource also leverage technologies from the cloud that might not otherwise be available to them, in house, absent the cloud environment.

As with any new paradigm, considerable discussion is taking place regarding how best to utilize the environment. As one example, there has been recent interest in leveraging the public/private cloud infrastructure to make portable workloads of traditional data centers. To better explain this, consider a traditional data center workload operating on its associated data. (Assume here that the workload specific data is located in a single file with the workload executing on a single machine.) By "virtualizing" the workload, however, it can be hosted anywhere on any appropriate hardware. In turn, as the workload is migrated from one physical machine to another, the workload needs access to its associated data no matter where it is located. While a traditional data center solves this problem by hosting data via a storage area network (SAN) or a network file system that permits access to the data in a secure fashion independent of which physical machine the workload is hosted, this is not possible with present cloud architectures.

Furthermore, the size of the data and other security concerns may preclude co-locating the data with the workload. For instance, it is not uncommon for large enterprises to have terabytes of valuable data, such as sales information. Enterprises are then loathe to host the data in a cloud environment where it might be copied or lost and moving back and forth terabytes of data from a home location to the cloud is infeasible because of transmission bandwidth concerns and latency effects.

Accordingly, a need exists for better managing data for consumption by workloads. The need further contemplates data management in support of portable workloads, including minimizing bandwidth requirements for data migration while simultaneously shielding the workload from the latency of migrating it. Even more, the need should extend to securely vending the data for consumption. Any improvements along such lines should contemplate good engineering practices, such as simplicity, ease of implementation, unobtrusiveness, stability, etc.

SUMMARY OF THE INVENTION

The foregoing and other problems become solved by applying the principles and teachings associated with the hereinafter-described data placement and management for workloads in a virtual computing environment. Broadly, methods and apparatus involve intelligently pre-placing data closer to workloads requiring its consumption to minimize data transmission bandwidth and overcome latency effects created by consumption of remotely stored data. This is especially convenient in situations where workloads are deployed in "cloud" computing environments while the data is stored remotely in a home, data-center repository.

To begin, access patterns of the data by the workload are identified. Based thereon, portions of the data are migrated from a first storage location farther away the workload to a second storage location closer the workload. Also, the data is migrated just in time or when needed by the workload during use.

In various embodiments, a data vending service and proxy are situated between the home repository and the cloud-deployed workload and serve to manage and migrate the data as needed. This includes at least first and second computing devices having a hardware platform with a processor and memory upon which a plurality of workloads are configured under the scheduling control of a hypervisor. At least first (home repository) and second storage devices exist local to the first and second computing devices respectively for storing the data that is to be consumed by the workloads. The data vending service is configured with the first storage device and authenticates workloads that seek to bind with the data. It also migrates apportionments of the whole of the data to the second storage device closer to the second computing device at a time when required by the workload. The data proxy service in communication with the data vending service exposes storage semantics of the migrated data to appear to the workloads as locally stored data. A secure tunnel is also used to connect the data vending and proxy services. De/Encryption to securely vend the data between the services is also contemplated as is (de)compression.

Data recognition patterns are disclosed as is apportionment of the whole of the data into convenient migration packets. This includes identifying access patterns according to storage blocks and determining when such are used by the workload. The migration of data then includes migrating the data of the blocks when needed. When no longer needed, the data can be destroyed.

Executable instructions loaded on one or more computing devices for undertaking the foregoing are also contemplated as are computer program products available as a download or on a computer readable medium. The computer program products are also available for installation on a network appliance or an individual computing device.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that fort a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for placing and managing data for workloads in a virtual computing environment.

Figure 1:
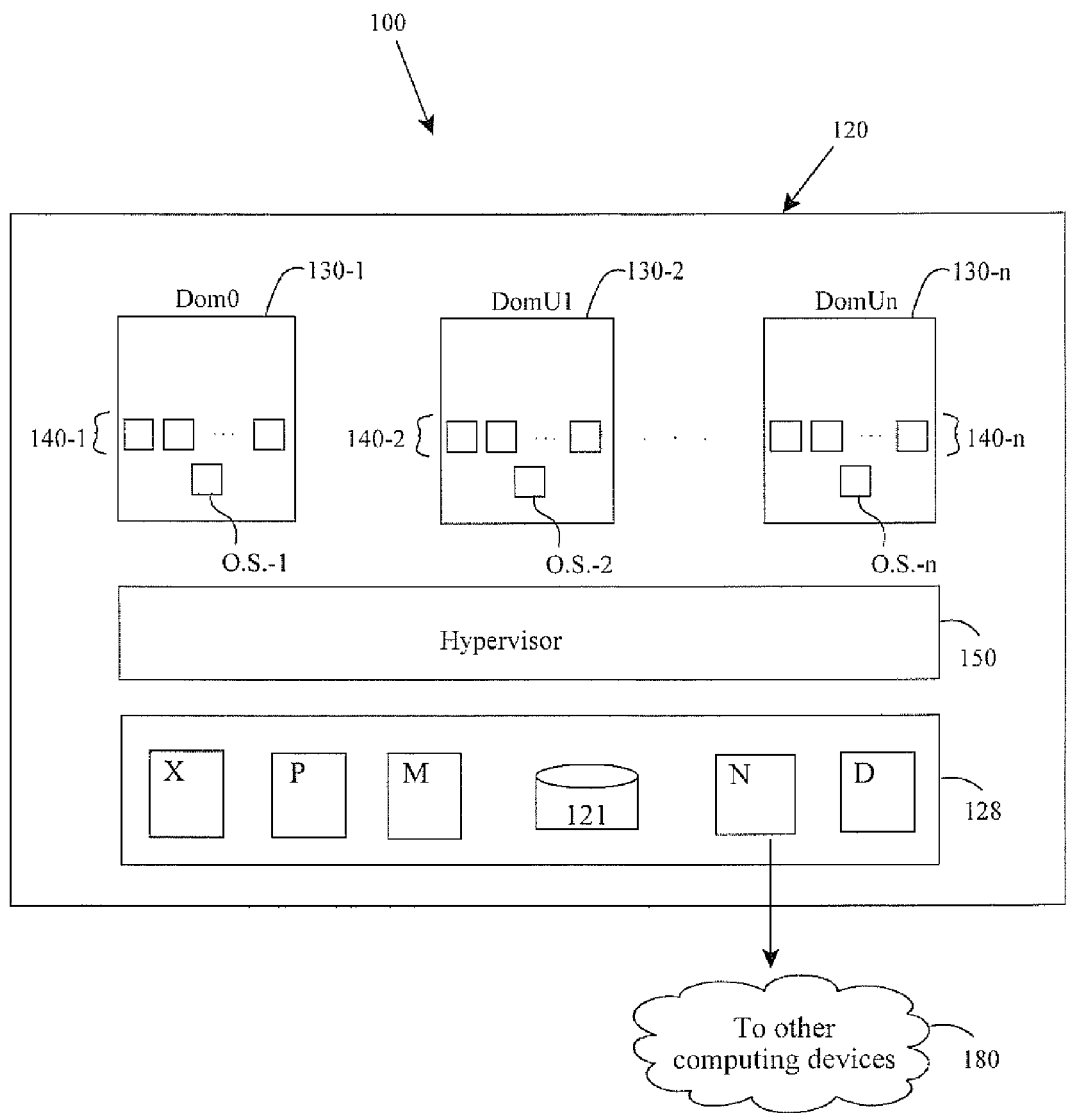
FIG. 1 is a diagrammatic view in accordance with the present invention of a basic computing device for hosting workloads.

With reference to FIG. 1, a computing system environment 100 includes a computing device 120. Representatively, the device is a general or special purpose computer, a phone, a PDA, a server, a laptop, etc., having a hardware platform 128. The hardware platform includes physical I/O and platform devices memory (M), processor (P), such as a CPU(s), USB or other interfaces (X), drivers (D), etc. In turn, the hardware platform hosts one or more virtual machines in the form of domains 130-1 (domain 0, or management domain), 130-2 (domain U1), ... 130-n (domain Un), each having its own guest operating system (O.S.) (e.g., Linux, Windows, Netware, Unix, etc.), applications 140-1, 140-2, ... 140-n, file systems, etc. The workloads of each virtual machine also consume data stored on one or more disks 121.

An intervening Xen or other hypervisor layer 150, also known as a "virtual machine monitor," or vitualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform.

In use, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
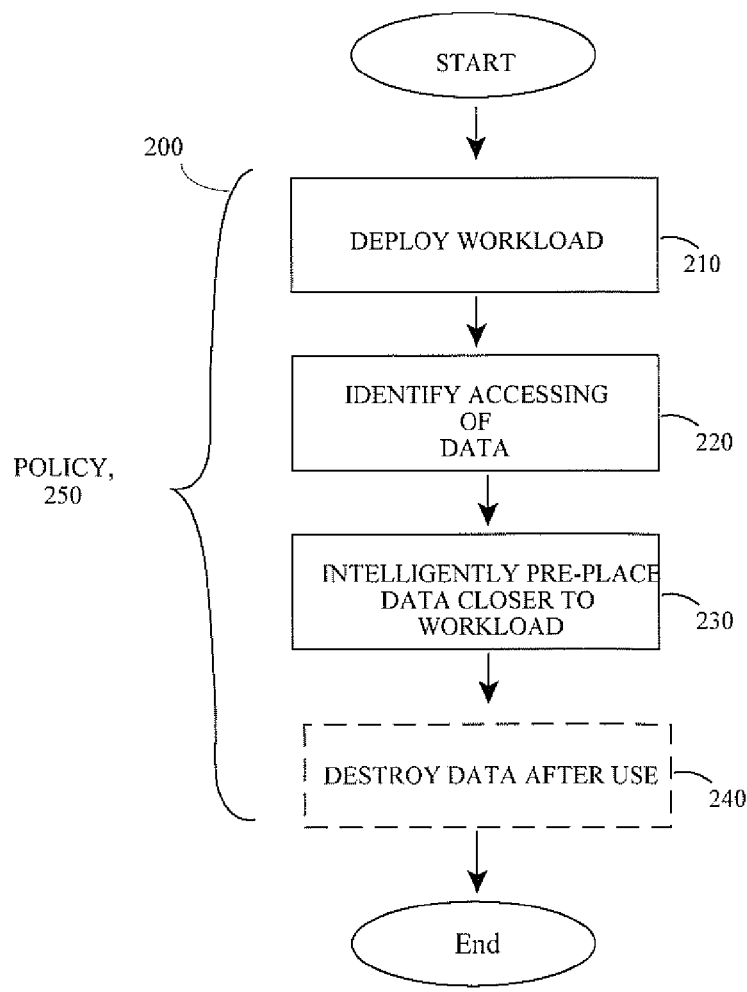
FIG. 2 is a flow chart in accordance with the present invention for intelligently placing data for workloads in a virtual environment.

Leveraging the foregoing, FIG. 2 shows a flow 200 for placing and managing data for a workload, such as those shown in FIG. 1. At step 210, the workload is first deployed on a computing device. This can occur by actually deploying the workload in an environment in which it is to be used. Alternatively, this can occur by deploying the workload under a simulated condition for testing purposes. In either, they can exist in a cloud computing environment or in a more traditional data center, or elsewhere. It may also be the situation that multiple workloads will run on a same or different hardware platform and may be instantiated as virtual machines copied from golden or virgin images stored in the environment (not shown).

Once deployed, the accessing of data by the workload is identified, step 220. For example, many large corporations run monthly financial reports regarding sales data kept in a repository (e.g., 121, FIG. 1). How the workload accesses this data may be random, predictable or variations of each. In some instances, it may be predictable that storage blocks of data in a disk are accessed in sequential order, such as first accessing block 0, then block 1, block 2, and so on, until the last block of data is accessed to run a report. Alternatively, storage blocks may be accessed in a back and forth manner, such as by accessing block 0, then accessing block 30 and then back to block 0. Alternatively still, storage blocks may be accessed in an algorithmic form, such as by accessing block 0, then accessing block 0+x, and so on. In any situation, this identification reveals trace data about how the workload functions and, so, it is known beforehand when the workload will require its data. The information too may be saved as additional data in the environment and may be mapped, stored as look up tables, etc.

In turn, once the information is known, the data necessary for consumption by the workload can be intelligently pre-placed "closer" to the workload requiring it, step 230. In this sense, "closer" can mean physically closer to the workload or closer in computing distance, which equates to faster retrieval by the workload and less latency effects. To the extent the data itself is large, the data that gets placed close might just be an apportionment of a whole of the data that is otherwise remote.

Figure 3:
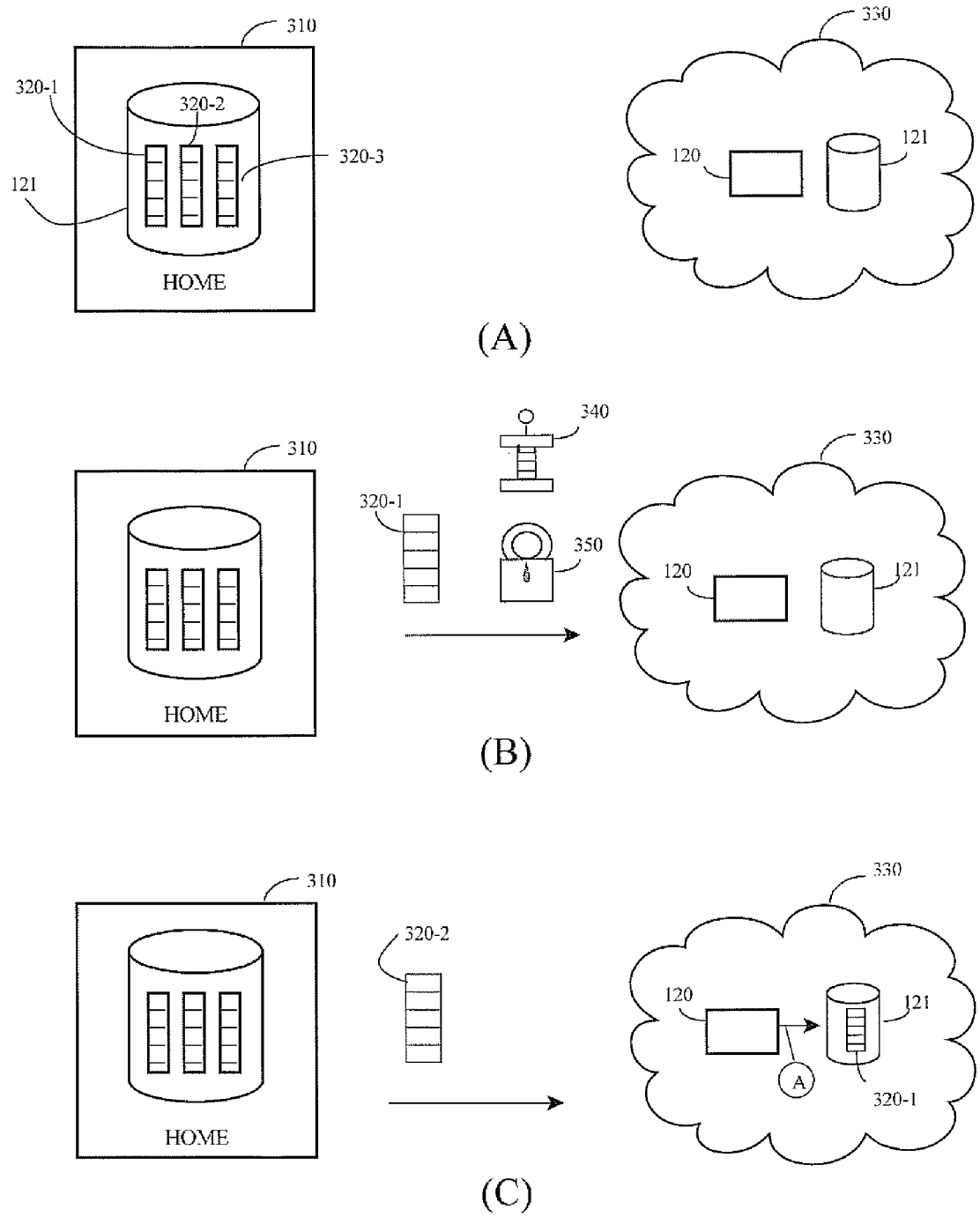
FIGS. 3A-3C are diagrammatic views in accordance with the present invention for intelligent placement of data for workloads.

As an example, FIGS. 3A-3C show a home repository 310 stored with data 320-1, 320-2, 320-3 for consumption by a workload on a computing device 120. (Assume too for this example that the data needed by the workload during use occurs sequentially with 320-1 being needed initially, 320-2 being needed next, and 320-3 being needed last.) Upon the workload being deployed in a cloud 330 far away from a storage location associated with the "home," latency effects are seen by the workload if the data 320 is always served from its far away location. Thus, FIG. 3B illustrates moving or migrating a portion of the data 320-1 to a storage device 121 in the cloud 330 which is closer to the workload. Then, when accessing A the data by the workload, the latency effects are minimized, FIG. 3C.

Also, the whole of the data need not be transmitted at once to the workload in FIG. 31B, since it is already known from its trace data (step 220, FIG. 2), which data is required and at which times. This then allows for only an apportionment of data, e.g., 320-1, to be sent to the workload, which minimizes the requisite bandwidth for data transmission. Upon the workload consuming the data 320-1, other data can be migrated closer, such as data 320-2, then 320-3, and so on. Of course, the next to-be-used data being migrated from the home repository need not await the complete consumption by the workload before being sent. How much data to send and when exactly to send it is a balance based on variables such as time to migrate data, volume of storage at the closer storage location, time to consume already migrated data, and the like. Also, already consumed data by the workload may be optionally destroyed, deleted, etc., at the closer location to further enhance security, minimize cloning, minimizing copying, etc. (step 240, FIG. 2).

Additional techniques such as compression 340 and encryption 350 of the data are also contemplated to further minimize the transmission bandwidth or enhance security. For both, well known or future algorithms and techniques can be used. A secure tunnel, such as VPN, could be used between the home location and the workload, as well.

Figure 4:
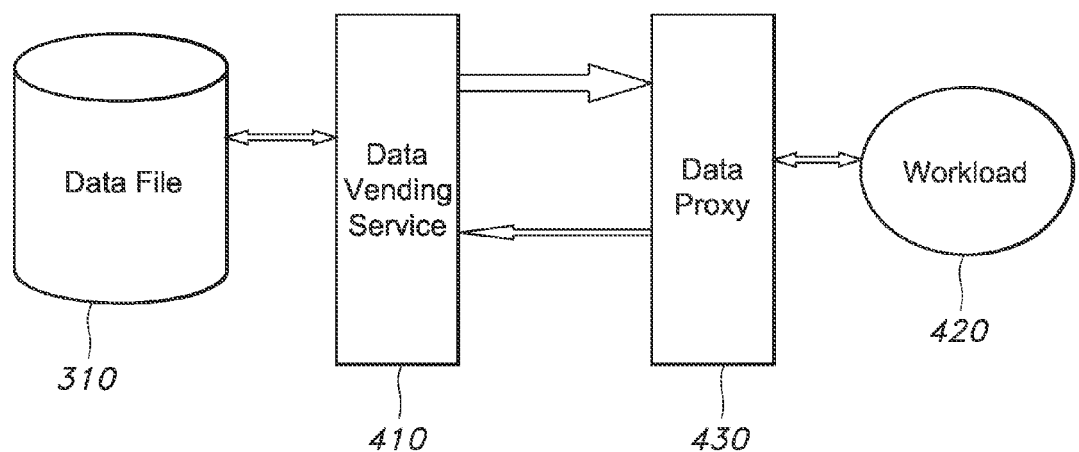
FIG. 4 is a diagrammatic view in accordance with the present invention of a more detailed computing environment for intelligently placing data and managing it for workloads.

With reference to FIG. 4, a representative architecture of the invention is given as 400. To simply the discussion, it is assumed that the data to be managed/migrated is file based. However, this invention is equally applicable in dealing with raw block devices instead.

Again, each data repository has "home location" 310. Associated with each data repository is a Data Vending Service (DVS) 410 that is responsible for (a) authenticating workloads that may want to bind to this repository, and (b) managing the migration of data to and from the point where the data will be consumed. On the other hand, each workload 420 is associated with a Data Proxy Service (DPS) 430. The DPS is responsible for (a) authenticating the workload to the DVS, and (b) migrating and managing chunks of data to optimally satisfy the data access patterns of the workload under question. When data is migrated from a home location in an enterprise data center to a public cloud infrastructure, the DPS manages data migration to minimize the access latencies seen by the workload while minimizing the bandwidth requirements to migrate the data from the DVS. This occurs based on the trace based data described in FIG. 2. (Since data center workloads are traditionally long-lived, it is possible to generate trace information on data access patterns of the workloads, e.g., the monthly financial report.)

Furthermore, the locality of data accesses can be leveraged to determine what chunk of data needs to be pre-fetched, and when. Without loss of generality, assume the situation in which NFS is used to export the "data file" to the workload. The DPS can then implement the file proxy as a memory mapped file. When the workload accesses the data file, if the data is not cached in DPS, it would take a page fault in DPS. This page fault can be then used to trigger the migration of an appropriate "chunk" of data (e.g., 320-1) from the DVS. The "chunk" size can be based on the workloads access patterns to minimize the access latencies. To minimize the bandwidth requirement, the chunk can be compressed 340 prior to transmission from the DVS. The DPS then de-compresses the chunk and populates the appropriate portion of the mapped file and the faulting instruction is resumed. If the chunk size is large, it is expected to have fewer page faults while it may take more time to migrate the data. Another option is to keep the chunk size small so that the data can be accessed as quickly as possible while multiple chunks are streamed to the workload that are spacially around the chunk under question. For workloads that exhibit a large read to write ratio for its data access, DPS can map the data read-only so that all modifications to this data can be tracked as a delta. When the workload is terminated, only this delta need be transmitted back to the DVS.

Figure 5:
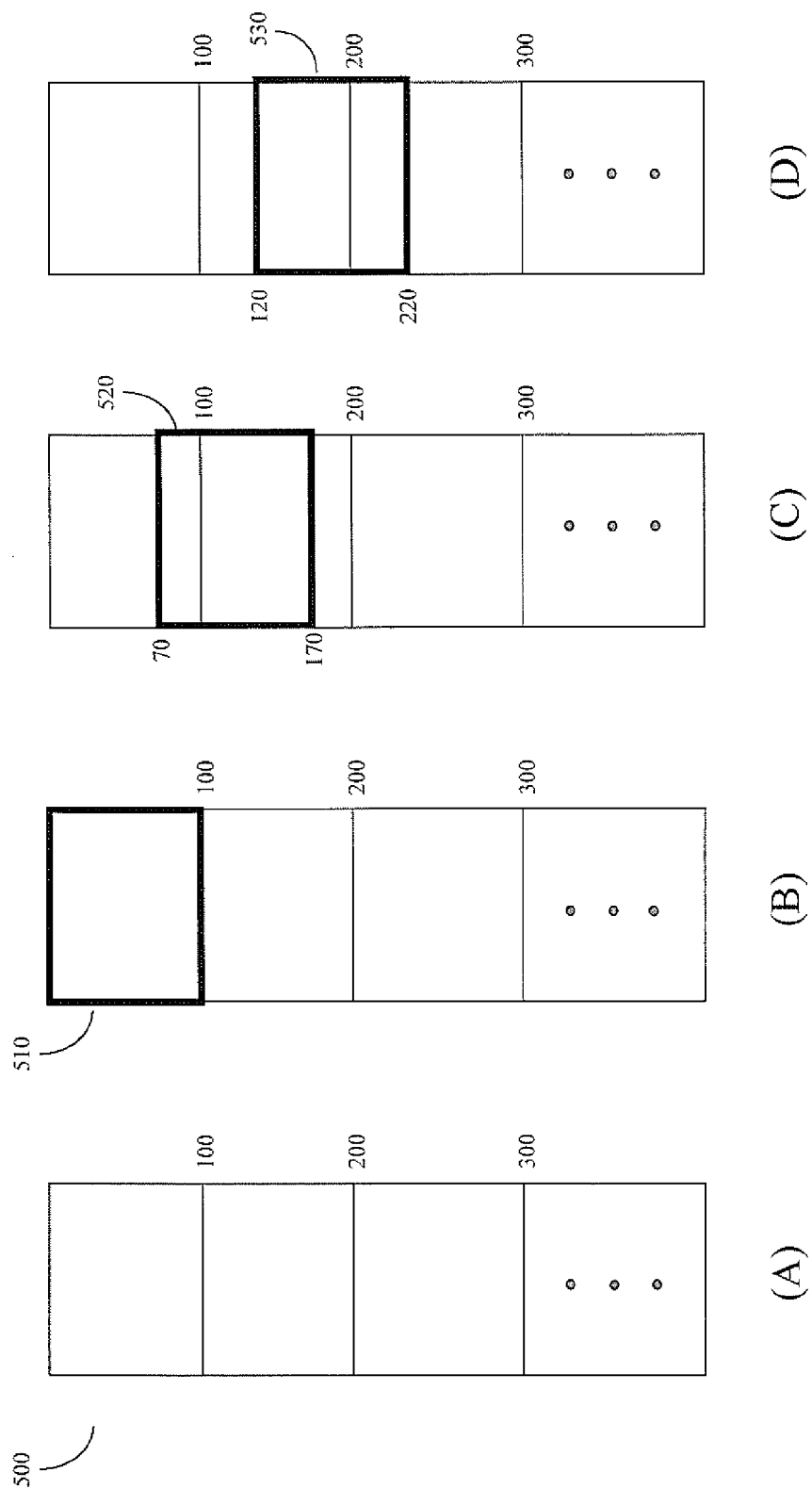
FIGS. 5A-5D are diagrammatic views in accordance with the present invention of a representative example for intelligently placing and managing data for workloads.

With reference to FIGS. 5A-5D, one further example for vending portions of data is given for a large amount data 500, such as a terabyte of data stored as megabytes 100, 200, 300, etc., FIG. 5A. Based upon system requirements and a policy that recognizes sufficiency in migrating data in sizes of 100 megabytes (or a ratio of 10:1 of total size to transmitted size), the first 100 megabytes 510 are selected and migrated closer to a workload requiring it, FIG. 5B. To overlap the data for consumption by the workload, the second migration of data does not include the megabytes 101-200, but a 100 megabyte window 520 from about 70-1707 FIG. 5C. Similarly, FIG. 5D shows the third portion of data 530 being migrated as that in megabytes 120-220. In this way, the data needed by the workload can be assured to satisfy the policy requirement of a 10:1 ratio and be at the workload at a time when needed. Of course, other migration schemes are readily imagined by skilled artisans.

Policies may further dictate what types of schemes are involved. In FIG. 2, this is seen as Policy 250 underlying the various processes in method 200. Of course, a computing policy can be established at an enterprise level, division level, individual level, etc. It can include setting forth the computing situations in which data migration and management will be used, and whether such are optional or required. Further still, policies may specify when and how long data migration is required. This can include establishing the time for migrating, setting forth an expiration or renewal date, or the like. Policies may also include defining a quality of service for either the data or workloads and hardware platform requirements, such as device type, speed, storage, etc. These policies can also exist as pail of a policy engine that communicates with other engines, such as a deployment engine, or the DVS, DPS, in FIG. 4. Skilled artisans can readily imagine other scenarios.

Figure 6:
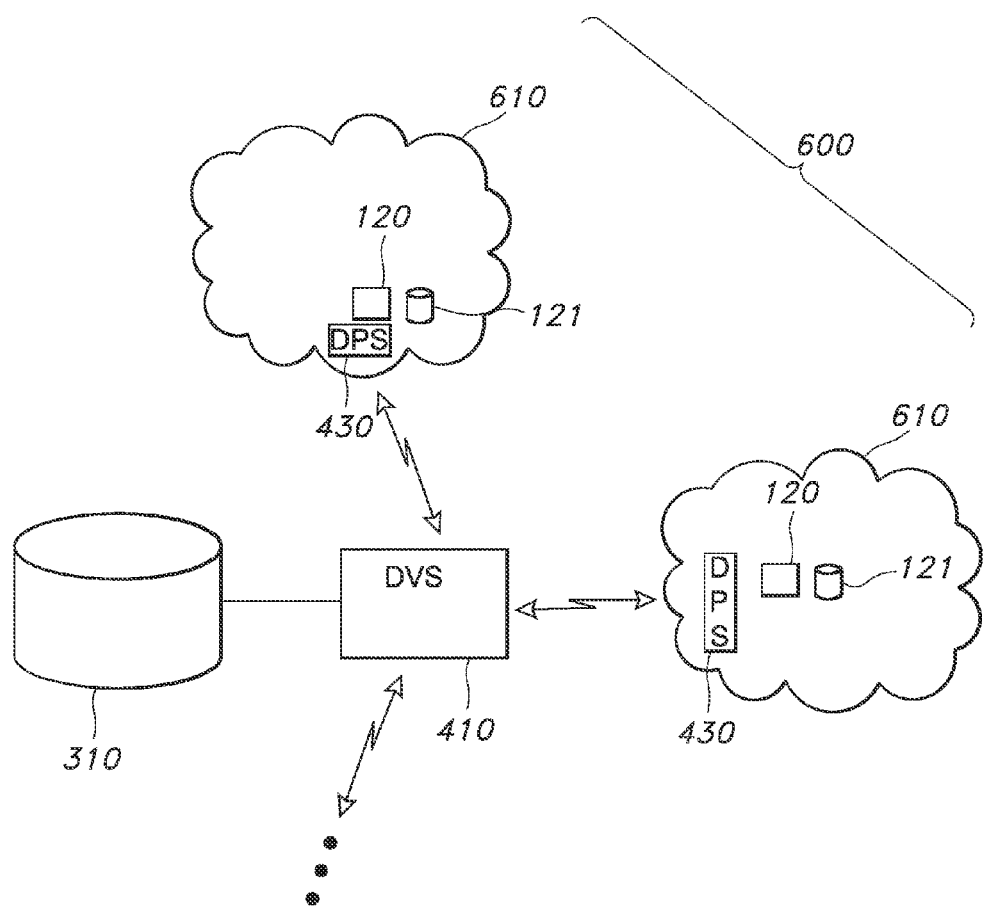
FIG. 6 is a diagrammatic view in accordance with the present invention of a data center environment for workloads.

With reference to FIG. 6, the features of the invention can be replicated many times over in a larger computing environment 600, such as a "cloud" environment or a large enterprise environment. For instance, multiple data centers 610 could exist that are each connected by way of a common DVS 410. In turn, each data center or cloud could include an individual DPS 430 that provides data vended from the home repository 310 to each of manly computing devices 120 and their attendant structures in order to overcome latency and bandwidth issues of modern cloud environments. In turn, the computing policies, FIG. 2, could be centrally managed by the DPS and could further include scaling to account for competing interests between the individual data centers. Other policies could also exist that harmonize the events of the data centers. Alternatively still, each data center could have its own DPS. Nested hierarchies of all could further exist.

Ultimately, skilled artisans should recognize at least the following advantages. Namely, they should appreciated that the foregoing: 1) supports the portability of workloads to deploy to any of a variety of computing devices, no matter where they are located; 2) supports a workload location/environment in an agnostic fashion to allow the free migration to different physical locations in a way that is completely transparent to the workload; 3) minimizes the bandwidth requirements of data transmission; 4) simultaneously minimizes data access latencies from workloads regardless of where deployed; and 5) improves data security in public cloud environments.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of placing data for consumption by workloads of computing devices having hardware platforms, comprising:
identifying patterns of access by the workload to the data stored on a storage computing device at a first storage location to predetermine when and which portion of the data the workload will consume by establishing traces, the traces comprising trace data defining at least one of an order and a timing of access to particular storage blocks of the data by the workload, wherein the order reveals patterns of the storage blocks of the data being accessed in sequential, algorithmic, or back and forth manner;
based on the traces, apportioning a whole of the data into portions whereby a data access pattern of the workload is satisfied; and
migrating a first portion of the data from the storage computing device at the first storage location farther away from the workload to a second storage computing device at a second storage location closer to the workload just in time for consumption by the workload during use.

2. The method of claim 1, further including deploying the workload first near the storage location to said identify the access patterns and second near the second storage location in a cloud computing environment, the second deploying of the workload occurring before the migrating the portion of the data.

3. The method of claim 1, further including migrating a next portion of the data from the storage computing device at the storage location farther away from the workload to the second storage computing device at the second storage location closer to the workload at a second time later said time when just needed by the workload during use.

4. The method of claim 3, further including destroying the migrated portion of the data at the second storage computing device at the second storage location closer to the workload after said migrating the next portion of the data.

5. The method of claim 1, further including compressing the portion of the data before the migrating and decompressing the portion of the data after the migrating.

6. The method of claim 1, further including encrypting the portion of the data before the migrating and decrypting the portion of the data after the migrating.

7. In a computing system environment, a method of placing data for consumption by workloads of computing devices having hardware platforms, comprising:
deploying the workload to a computing device for use;
establishing traces for patterns of access of the workload to the data stored on a storage computing device at a first storage location to predetermine when and which portion of the data the workload will consume, the traces comprising trace data defining at least one of an order and a timing of access to particular storage blocks of the data by the workload, wherein the order reveals patterns of the storage blocks of the data being accessed in sequential, algorithmic, or back and forth manner;
based on the traces, apportioning the data into portions for said consumption by the workload whereby a data access pattern of the workload is satisfied; and
migrating a first portion of the data to a second storage computing device at a second storage location closer to the workload just in time for said consumption by the workload during use.

8. The method of claim 7, wherein the apportioning the data further includes establishing a ratio of total data size to needed data size.

9. The method of claim 8, wherein the migrating further includes migrating the first portion of the data in an amount satisfying the ratio and later migrating a second portion of the data in a second amount also satisfying the ratio.

10. The method of claim 9, wherein the migrating the first and second portions further includes migrating overlapping portions of a whole of the data.

11. The method of claim 7, further including deploying the workload to a hardware platform other than a first hardware platform where the establishing traces occurred.

12. The method of claim 9, wherein the migrating the first and second portions further includes destroying the migrated first portion of the data at the second storage computing device at the second storage location closer to the workload after said migrating the second portion of the data.

13. A computing system to place data for consumption by workloads, comprising:
at least first and second computing devices having a hardware platform with a processor and memory upon which a plurality of workloads can be configured under the scheduling control of a hypervisor;
at least first and second storage devices local to the first and second computing devices respectively for storing the data that is to be consumed by the workloads;
a data vending service configured with the first storage device to migrate portions of a whole of the data to the second storage device closer to the second computing device at a time when one of the workloads is deployed on the second computing device, but formerly deployed on the first computing device; and
a data proxy service configured with each said workload to migrate portions of a whole of the data by the data vending service whereby a data access pattern of the workload is satisfied, the data access pattern being defined by predetermined trace data defining at least one of an order and a timing of access to particular storage blocks of the data by the workload, wherein the order consists of access patterns of the workload to the storage blocks of the data in sequential, algorithmic, or back and forth manner.

14. The computing system of claim 13, further wherein the data proxy service is in communication with the data vending service to expose storage semantics of the migrated portions of the whole of the data to appear as locally stored data to the one of the workloads when deployed on the second computing device.

15. The computing system of claim 13, wherein the data vending service is configured as executable instructions and authenticates any of the workloads that may seek to use any of said portions of the whole of the data.

16. The computing system of claim 13, wherein the data vending service and the data proxy service are configured to communicate via a secure computing tunnel.

17. The computing system of claim 13, further including executable instructions to compress or encrypt any of said portions of the whole of the data before the migration by the data vending service.

* * * * *